(12) United States Patent
Nakamoto (10) Patent No.: US 10,501,222 B2
(45) Date of Patent: Dec. 10, 2019

(54) ARTICLE TRANSPORT APPARATUS

(71) Applicant: Toyo Jidoki Co., Ltd., Minato-ku, Tokyo (JP)

(72) Inventor: Kakue Nakamoto, Iwakuni (JP)

(73) Assignee: Toyo Jidoki Co., Ltd., Tokyo (JP)

(*) Notice: Subject to any disclaimer, the term of this patent is extended or adjusted under 35 U.S.C. 154(b) by 166 days.

(21) Appl. No.: 15/648,902

(22) Filed: Jul. 13, 2017

(65) Prior Publication Data

US 2018/0016045 A1    Jan. 18, 2018

(30) Foreign Application Priority Data

Jul. 14, 2016    (JP) .................................. 2016-139745

(51) Int. Cl.
| | |
|---|---|
| B65G 21/12 | (2006.01) |
| B65B 43/46 | (2006.01) |
| B65B 1/04 | (2006.01) |
| B65B 3/04 | (2006.01) |
| B65G 17/12 | (2006.01) |

(Continued)

(52) U.S. Cl.
CPC .............. *B65B 43/465* (2013.01); *B65B 1/04* (2013.01); *B65B 3/04* (2013.01); *B65B 7/16* (2013.01); *B65B 43/52* (2013.01); *B65B 51/10* (2013.01); *B65B 51/32* (2013.01); *B65G 17/12* (2013.01); *B65G 17/323* (2013.01); *B65G 21/12* (2013.01); *B65G 47/842* (2013.01); *B65B 1/02* (2013.01); *B65B 3/02* (2013.01); *B65B 7/02* (2013.01);

(Continued)

(58) Field of Classification Search
CPC .............................. B65G 21/12; B65G 41/003

USPC .......... 198/468.5, 468.2, 468.4, 418.6, 631.1
See application file for complete search history.

(56) References Cited

U.S. PATENT DOCUMENTS

| 3,965,656 A | 6/1976 | Gerben |
| 5,096,041 A | 3/1992 | van Ravenhorst |
| 6,390,272 B1 * | 5/2002 | Tsutsui .................... B65B 43/52 |
| | | 198/343.1 |

FOREIGN PATENT DOCUMENTS

| EP | 1035023 A1 | 9/2000 |
| JP | H03-240615 A | 10/1991 |

(Continued)

OTHER PUBLICATIONS

European Search Report dated Dec. 11, 2017 issued to corresponding EPC Application No. 17001204.1.

*Primary Examiner* — Marina A Tietjen
*Assistant Examiner* — Paul J Gray
(74) *Attorney, Agent, or Firm* — Norton Rose Fulbright US LLP (57) ABSTRACT

A transport apparatus including a rotary transport mechanism (5), which rotationally transports multiple equidistantly installed article holding members (gripper pairs (4)) in one direction along an annular trackway having a pair of parallel portions, and a reciprocating drive mechanism (6), which causes the entire rotary transport mechanism (5) to reciprocate a predetermined distance along the parallel portions. The article holding members are moved at a velocity of travel that is a combination of velocity of the reciprocating motion and velocity of the rotary transport. The velocity of the rotary transport and the velocity of the reciprocating motion are controlled by a control unit (9). The article holding members travel along the parallel portions on both sides (Lanes A and B) in an intermittent manner, each time (Continued)

covering a distance that is an integral multiple of the installation spacing p of the article holding members.

27 Claims, 9 Drawing Sheets

(51) Int. Cl.
| | | |
|---|---|---|
| *B65G 17/32* | (2006.01) | |
| *B65B 43/52* | (2006.01) | |
| *B65G 47/86* | (2006.01) | |
| *B65B 51/10* | (2006.01) | |
| *B65B 51/32* | (2006.01) | |
| *B65B 7/16* | (2006.01) | |
| *B65B 43/44* | (2006.01) | |
| *B65G 23/30* | (2006.01) | |
| *B65B 1/02* | (2006.01) | |
| *B65B 3/02* | (2006.01) | |
| *B65B 7/02* | (2006.01) | |

(52) U.S. Cl.
CPC .............. *B65B 43/44* (2013.01); *B65G 23/30* (2013.01); *B65G 2201/0238* (2013.01)

(56) References Cited

FOREIGN PATENT DOCUMENTS

| JP | 2002-302227 A | 10/2002 |
|---|---|---|
| JP | 4190692 | 12/2008 |

* cited by examiner

ARTICLE TRANSPORT APPARATUS

BACKGROUND OF THE INVENTION

1. Field of the Invention

The present invention relates to an article transport apparatus in which articles, held by multiple article holding members installed at equal intervals, are rotated along an annular trackway (racetrack-type trackway) having a pair of parallel portions.

2. Background Art

Japanese Patent No. 4,190,692 discloses an article transport apparatus provided with a rotary transport mechanism and a reciprocating drive mechanism, in which the rotary transport mechanism rotationally transports multiple (or a plurality of) equidistantly installed article holding members in one direction along an annular trackway that includes a pair of parallel portions, and the reciprocating drive mechanism causes the entire rotary transport mechanism to reciprocate a predetermined distance along the parallel portions. In this transport apparatus, the rotary transport mechanism and the reciprocating drive mechanism are respectively provided with their own drive sources (servo motors). The article holding members have a travel velocity that is a combination of the velocity of rotary transport and the velocity of reciprocating motion, so that the article holding members travel, on one side of the parallel portion, in an intermittent manner, each time covering a distance that is an integral multiple (p×n) of the installation spacing p, and travel, on the other side of the parallel portion, in a continuous manner at a constant velocity.

In the above-described transport apparatus, articles are simultaneously supplied to a plurality of (n) article holding members when the article holding members come to a stop on one side of the parallel portion, and articles are sequentially discharged from the article holding members traveling in a continuous manner on the other side of the parallel portion. Conversely, articles can be simultaneously discharged from a plurality of (n) article holding members when the article holding members come to a stop in a parallel portion on one side, and articles can be sequentially supplied to article holding members traveling in a continuous manner along the parallel portion on the other side. In addition, by way of controlling the rotation of the two servo motors so as to change the velocity of reciprocating motion and/or the velocity of rotary transport of the rotary transport mechanism, it is possible that an arbitrary selection is made for operating patterns, such as the number (n) or the stop duration, etc., of the articles supplied or discharged at a single time.

In the transport apparatus disclosed in Japanese Patent No. 4,190,692, the article holding members travel along the parallel portion on the other side in a continuous manner at a constant velocity. Accordingly, when the apparatus is used as, for example, a bag transport apparatus in a bag-filling packaging machine, it is necessary that the packaging members (such as filling nozzles of a filling device, extracting members of an article extraction device, and the like), which directly act upon the articles, are moved so as to track (or follow) the continuous travel of the articles, when the articles (bags) are filled with materials to be packaged or when the articles are extracted from the transport apparatus at the parallel portion on the other side, etc. Therefore, sometimes, when the operating patterns of the transport apparatus are changed, it is necessary to also change the operating patterns of the packaging members (the velocity of travel, the timing of commencement of tracking, etc.). Such changes are, however, complicated and time-consuming operation. In addition, the tracking mechanisms used in the filling devices, article extraction devices, and the like become more complicated in order to permit tracking by the packaging members in various operating patterns, causing complexity and increase in size of the apparatus.

BRIEF DESCRIPTION OF THE INVENTION

The present invention is made in view of the problems associated with such an article transport apparatus as described above, and it is an object of the invention to provide an article transport apparatus in which the need for operations involving complicated changes in the operating patterns of the packaging members and the like are eliminated even when the operating pattern of the transport apparatus is changed, and, in addition, the need for complicated tracking mechanisms is avoided as well.

The above object is accomplished by a unique structure of the present invention for an article transport apparatus in which the article transport apparatus includes:
   a rotary transport mechanism that rotationally transports multiple equidistantly installed article holding members in one direction along an annular trackway that has a pair of parallel portions, and
   a reciprocating drive mechanism that causes the entire rotary transport mechanism to reciprocate a predetermined distance along the parallel portions;
the rotary transport mechanism and the reciprocating drive mechanism are respectively provided with independent drive sources, which are servo motors, and;
the article transport apparatus further includes a control unit that controls (the rotation of) both servo motors; and
in this article transport apparatus,
   the article holding members have a travel velocity that is a combination of the velocity of rotary transport and the velocity of reciprocating motion,
   the velocity of rotary transport and the velocity of reciprocating motion are controlled by the control unit, and
   the article holding members travel along the parallel portions on both sides in an intermittent manner, each time covering a distance that is an integral multiple of the installation spacing of the article holding members.

In this transport apparatus of the present invention, by controlling the velocity of rotary transport and the velocity of reciprocating motion, it is possible that the article holding members take, for example, the following operating patterns:

(1) The intermittent travel distances of the article holding members along the parallel portions on one side and on the other side are different. However, the intermittent travel distances, both along the parallel portion on one side and along the parallel portion on the other side, are still an integral multiple of the installation spacing of the article holding members.

(2) The intermittent travel distances of the article holding members along the parallel portions on one side and on the other side are the same.

(3) The stop duration during the intermittent travel of the article holding members along the parallel portions on one side and on the other side is the same.

(4) The stop duration during the intermittent travel of the article holding members along the parallel portions on one side and on the other side is different.

The above-described transport apparatus is employed, for example, as a bag transport apparatus in a bag-filling packaging machine, in which the articles are bags, and the article holding members are, for example, pairs of grippers that grip both edges of each of the bags and hold them in a suspended state with the mouths of the bags pointing upwards. In this bag-filling packaging machine, a bag supplying device, which supplies bags to the grippers, is disposed next to the parallel portion on one side, and a filling device, which is used to dispense materials to be packaged (liquid material and/or solid material) into bags held by the grippers, is disposed next to the parallel portion on the other side. The intermittent travel distance of the grippers is m×p along the parallel portion on one side and n×p on the other side; and the bag supplying device simultaneously supplies bags to m pairs of grippers that come to a stop in the parallel portion on one side, and the filling device simultaneously dispenses materials to be packaged into bags held by n pairs of grippers that come to a stop in the parallel portion on the other side. In the above, p is the installation spacing, in a direction of transport, of the article holding members (gripper pairs), and m and n are any positive integers.

The above-described transport apparatus is also employed, for example, as a cup transport apparatus in a cup-filling packaging machine. In this case, the articles are cups and the article holding members are, for example, cup holding members that hold the cups. In this cup-filling packaging machine, a cup supplying device, which supplies the cups to the cup holding members, is disposed next to the parallel portion on one side, and a filling device, which is used to dispense materials to be packaged (liquid material and/or solid material) into cups held by the cup holding members, is disposed next to the parallel portion on the other side. The intermittent travel distance of the cup holding members is m×p along the parallel portion on one side and n×p on the other side; and the cup supplying device simultaneously supplies cups to m cup holding members that come to a stop in the parallel portion on one side, and the filling device simultaneously dispenses materials to be packaged into cups held by n cup holding members that come to a stop in the parallel portion on the other side. In this case as well, p is the installation spacing, in a direction of transport, of the article holding members (cup holding members), and m and n are any positive integers.

As seen from the above, in the present invention, a transport apparatus includes:

a rotary transport mechanism that rotationally transports multiple equidistantly installed article holding members in one direction along an annular trackway that has a pair of parallel portions, a reciprocating drive mechanism that causes the entire rotary transport mechanism to reciprocate a predetermined distance along the parallel portions, and independent drive sources (servo motors) respectively provided for the rotary transport mechanism and the reciprocating drive mechanism; and in this transport apparatus, the velocity of rotary transport and the velocity of reciprocating motion are controlled so that the article holding members travel in an intermittent manner, each time covering a distance that is an integral multiple of the installation spacing of the article holding members, along the parallel portions.

Accordingly, the need to move packaging members (such as filling nozzles of filling devices, extracting members of article extraction devices, and the like) in order to track the continuous travel of the articles is eliminated. As a result, there is no need to provide the filling devices and article extraction devices with complicated tracking mechanisms, and, in addition, even when the operating pattern of the transport apparatus is changed, there is no need to make complicated operations to change the operating patterns of the packaging members.

DETAILED DESCRIPTION OF THE INVENTION

A detailed description of the article transport apparatus according to the present invention, as well as a bag-filling packaging machine and a cup-filling packaging machine incorporating the transport apparatus, is provided below with reference to FIGS. 1 through 9.

Figure 1:
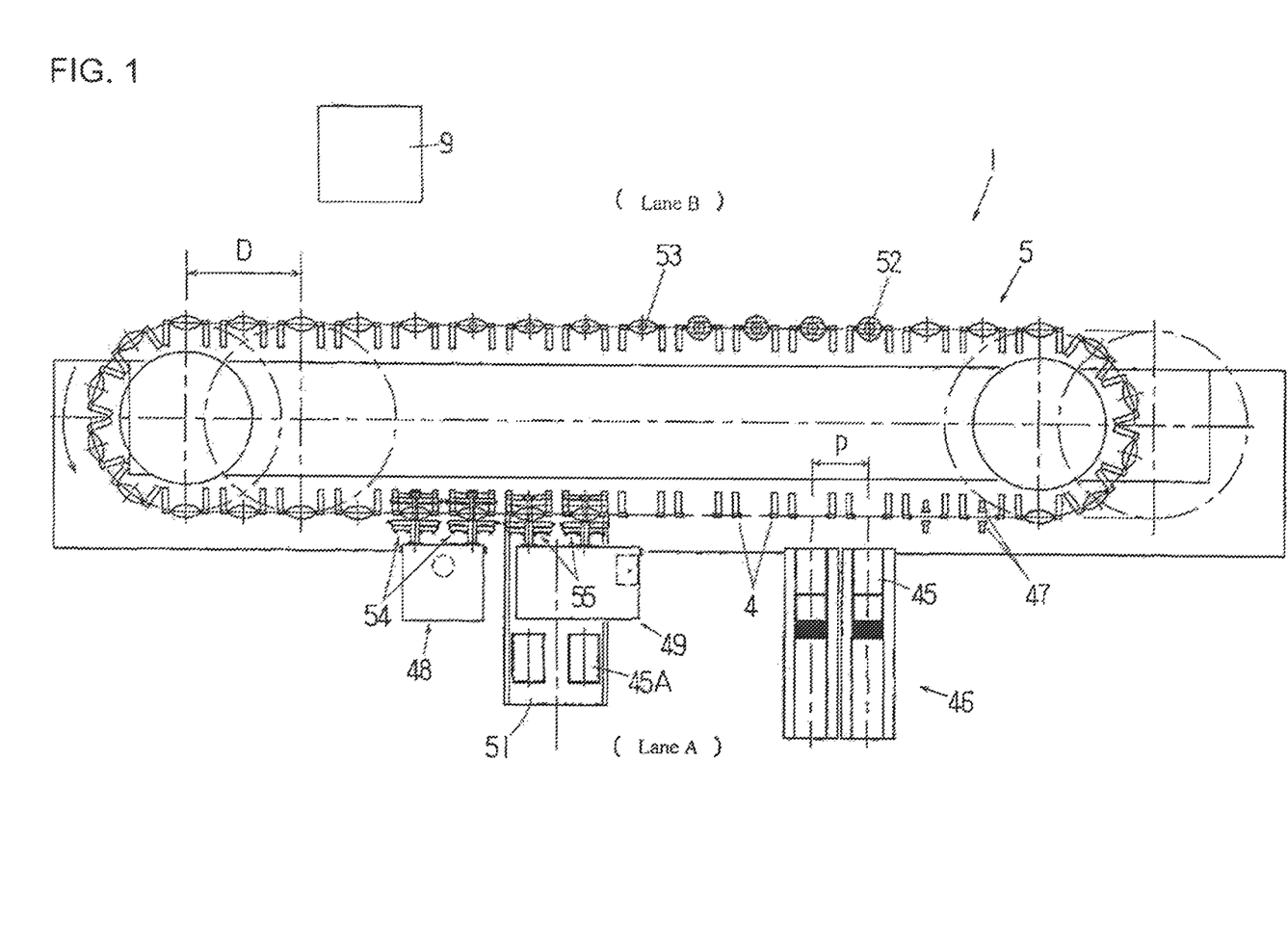
FIG. 1 is an overall top view of a bag-filling packaging machine incorporating a transport apparatus according to the present invention.
Figure 2:
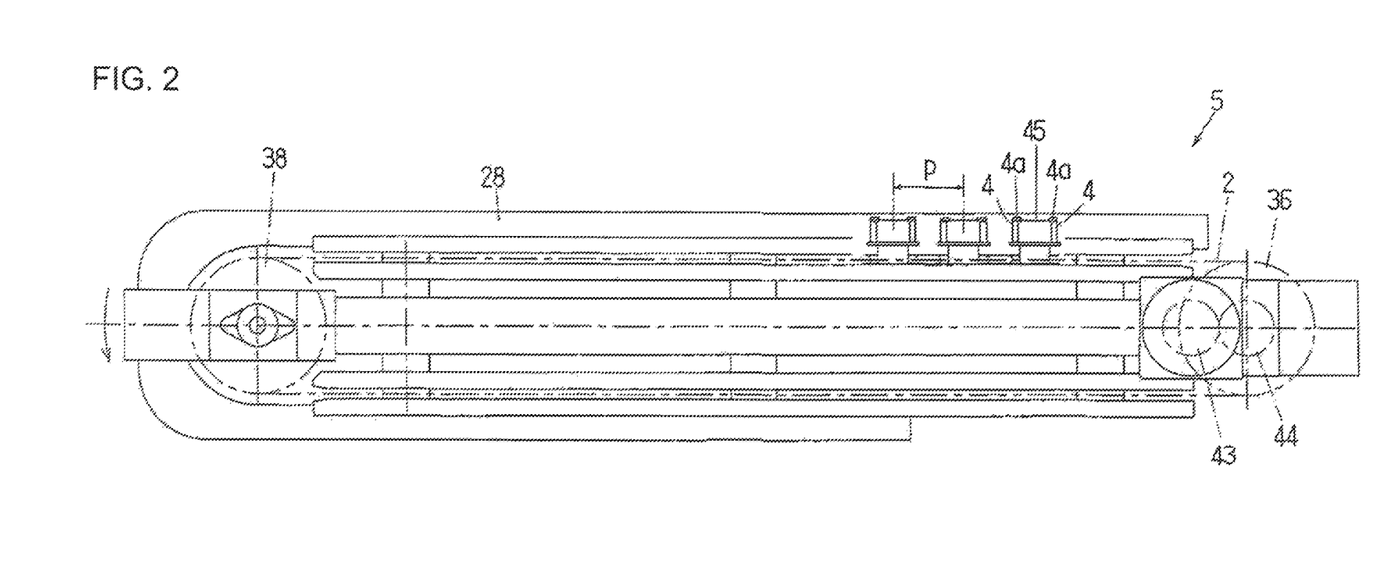
FIG. 2 is a top view of the transport apparatus according to the present invention.

FIG. 1 is a schematic top view of a bag-filling packaging machine. In this bag-filling packaging machine, bags are supplied to bag holding members (gripper pairs) provided in the transport apparatus, and, as the bag holding members are moved to travel along the annular trackway that has a pair of parallel portions (or two straight lanes in parallel), the bags are transported along an annular transport path, which is superimposed on the annular trackway, and are subjected to packaging operations by a plurality of packaging devices disposed along the pair of parallel portions of the annular trackway.

As shown in FIGS. 2 to 5, the transport apparatus 1 is comprised of a rotary transport mechanism 5 and a reciprocating drive mechanism 6. The rotary transport mechanism 5 rotationally transports multiple bag holding members (respectively made up of pairs of left- and right-hand grippers 4, 4) installed at equal intervals on endless conveyer chains (an upper conveyer chain 2 and a lower conveyer chain 3) in one direction (see the curved arrow in FIG. 2) along an annular trackway that has a pair of parallel portions. The reciprocating drive mechanism 6 causes the entire rotary transport mechanism 5 to reciprocate a predetermined distance along (or in the same direction as) the parallel portions.

The rotary transport mechanism 5 has a servo motor 7 used as a drive source thereof. The chains 2, 3 are rotated by the servo motor 7, thereby rotationally transporting the grippers 4, 4. The reciprocating drive mechanism 6 has a servo motor 8 used as a drive source thereof. The entire rotary transport mechanism 5 is caused to reciprocate a predetermined distance by the servo motor 8. Consequently, the velocity of travel of the grippers 4, 4 is a combination of the velocity of rotary transport, which is determined by the servo motor 7, and the velocity of reciprocating motion, which is determined by the servo motor 8. The reference numeral 9 in FIG. 1 is a control unit that controls the rotation of the servo motors 7, 8.

The basic structure of the transport apparatus 1 described above is substantially identical to that of the transport apparatus described in Japanese Patent No. 4,190,692 1, it will be, nonetheless, briefly described below.

Figure 3:
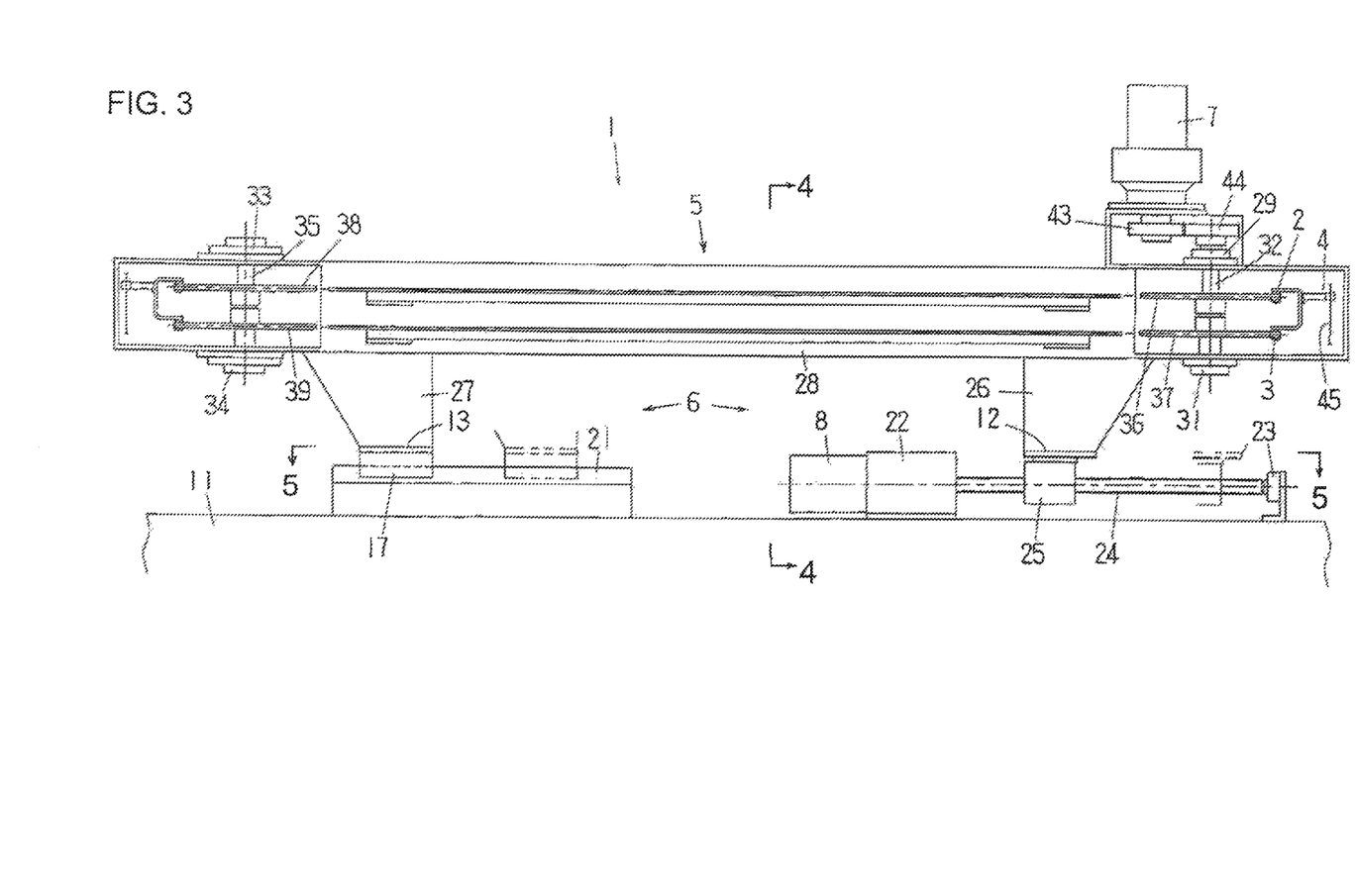
FIG. 3 is a side view of the transport apparatus of FIG. 2.
Figure 4:
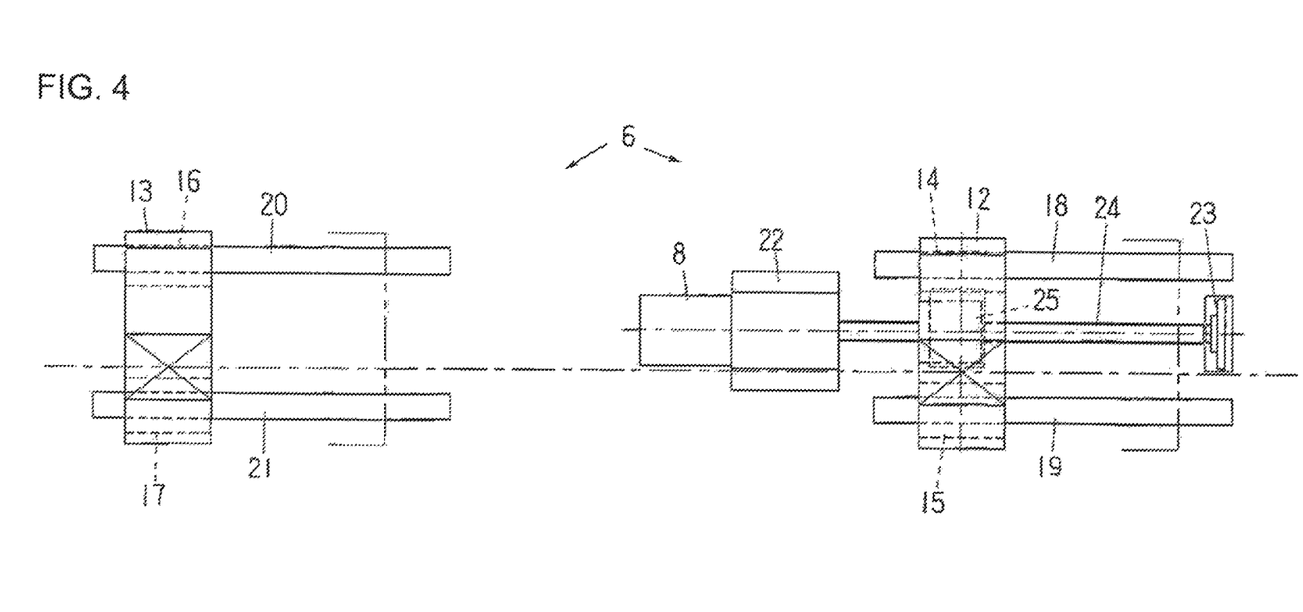
FIG. 4 is a cross-sectional view taken along the line 4-4 in FIG. 3.
Figure 5:
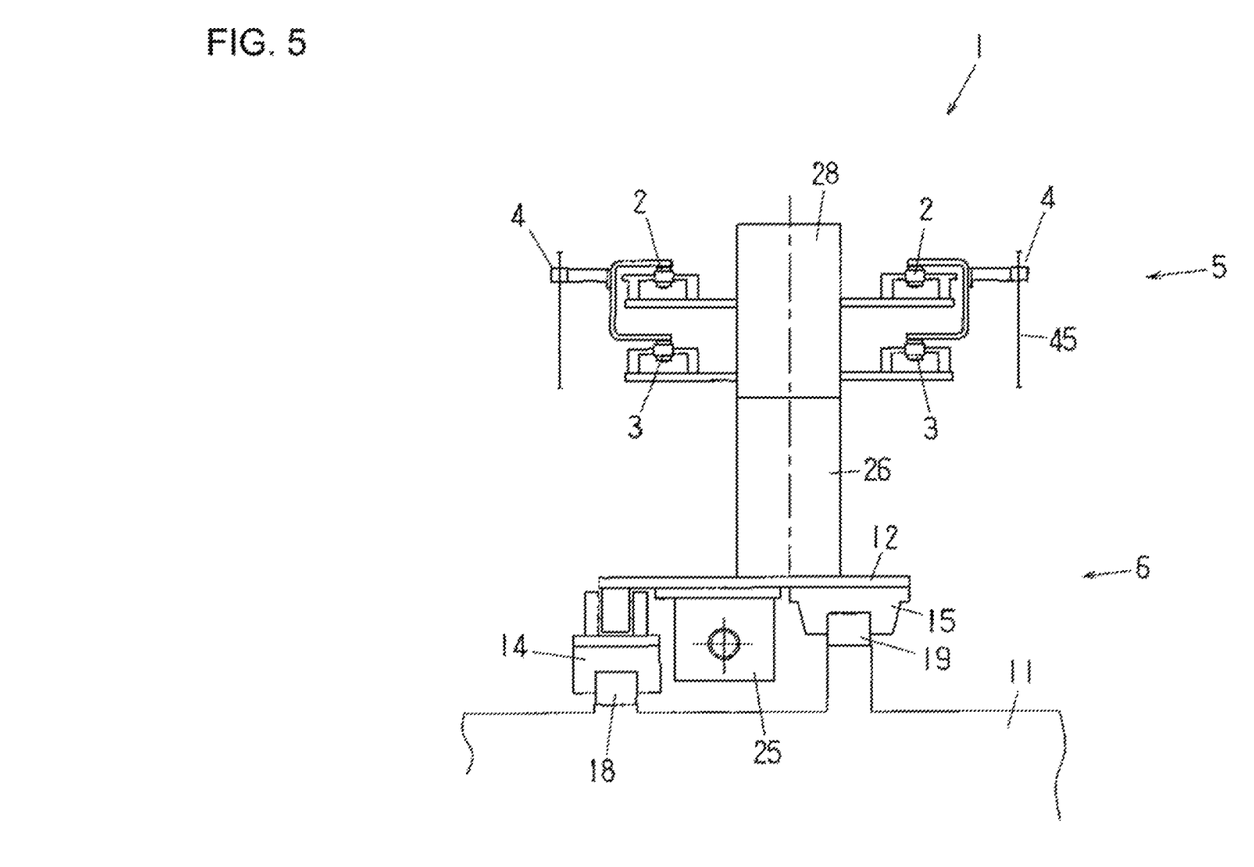
FIG. 5 is a cross-sectional view taken along the line 5-5 in FIG. 3.

As shown in FIGS. 3 to 5, the reciprocating drive mechanism 6 is disposed on a bed 11 and comprises: sliding members 14 to 17, which are disposed on the underside of frames 12, 13; rails 18 to 21, which are secured to the bed 11 and on top of which the sliding members 14 to 17 are provided so as to be slidable; bearings 22, 23, which are secured to the bed 11; a threaded rod 24, which is rotatably supported by the bearings 22, 23; the servo motor 8, which rotationally drives the threaded rod 24; a nut member 25, which is secured to the underside of the frame 12 and threadedly engaged with the threaded rod 24; and support frames 26, 27, which support a rotary transport mechanism 5. Driving the servo motor 8 positively and negatively allows for the entire rotary transport mechanism 5 to be longitudinally reciprocated.

The rotary transport mechanism 5 comprises: a main frame 28, which is supported on the support frames 26, 27 of the reciprocating drive mechanism 6 and is secured to the support frames 26, 27; a shaft 32, which is rotatably supported on the main frame 28 via bearings 29, 31; a shaft 35, which is likewise rotatably supported on the main frame 28 via bearings 33, 34; upper and lower sprockets 36 and 37, which are secured to the shaft 32; upper and lower sprockets 38 and 39, which are secured to the shaft 35; an upper conveyer chain 2, which runs between the upper sprockets 36, 38, and a lower conveyer chain 3, which runs between the lower sprockets 37, 39. Multiple gripper pairs 4, 4 are outwardly attached to these upper and lower conveyer chains 2, 3 at equal intervals (pitch=p). The driving power of the servo motor 7 is transmitted to the shaft 32 via gears 43, 44, thereby rotating the conveyer chains 2, 3 via the sprockets 36 to 39, so that the gripper pairs 4, 4 are rotationally transported along the annular trackway (for the direction of the rotation, see the curved arrow in FIG. 1). In the process of rotation along the annular trackway, the gripper pairs 4, 4 increase and decrease the spacing therebetween and their gripping portions 4a are opened and closed (so as to grip the edges of each of the bags when closed). A detailed description of the structures to mount the grippers on the chains and their operation is disclosed in Japanese Patent Application Laid-Open (Kokai) No. 2002-302227.

The main operating patterns that can be made by the transport apparatus 1 (particularly by the gripper pairs 4, 4) will be described here with reference to FIGS. 6 to 8. It should be noted that in any operating pattern the rotational speed of the servo motors 7, 8 (the velocity of the rotary transport of the gripper pairs 4, 4 and the velocity of reciprocating motion of the rotary transport mechanism 5) is controlled by the control unit 9 such that the gripper pairs 4, 4 travel in an intermittent manner, each time covering a distance that is an integral multiple of the installation spacing (pitch p), along both parallel portions (Lane A and Lane B) of the annular trackway.

Figure 6:
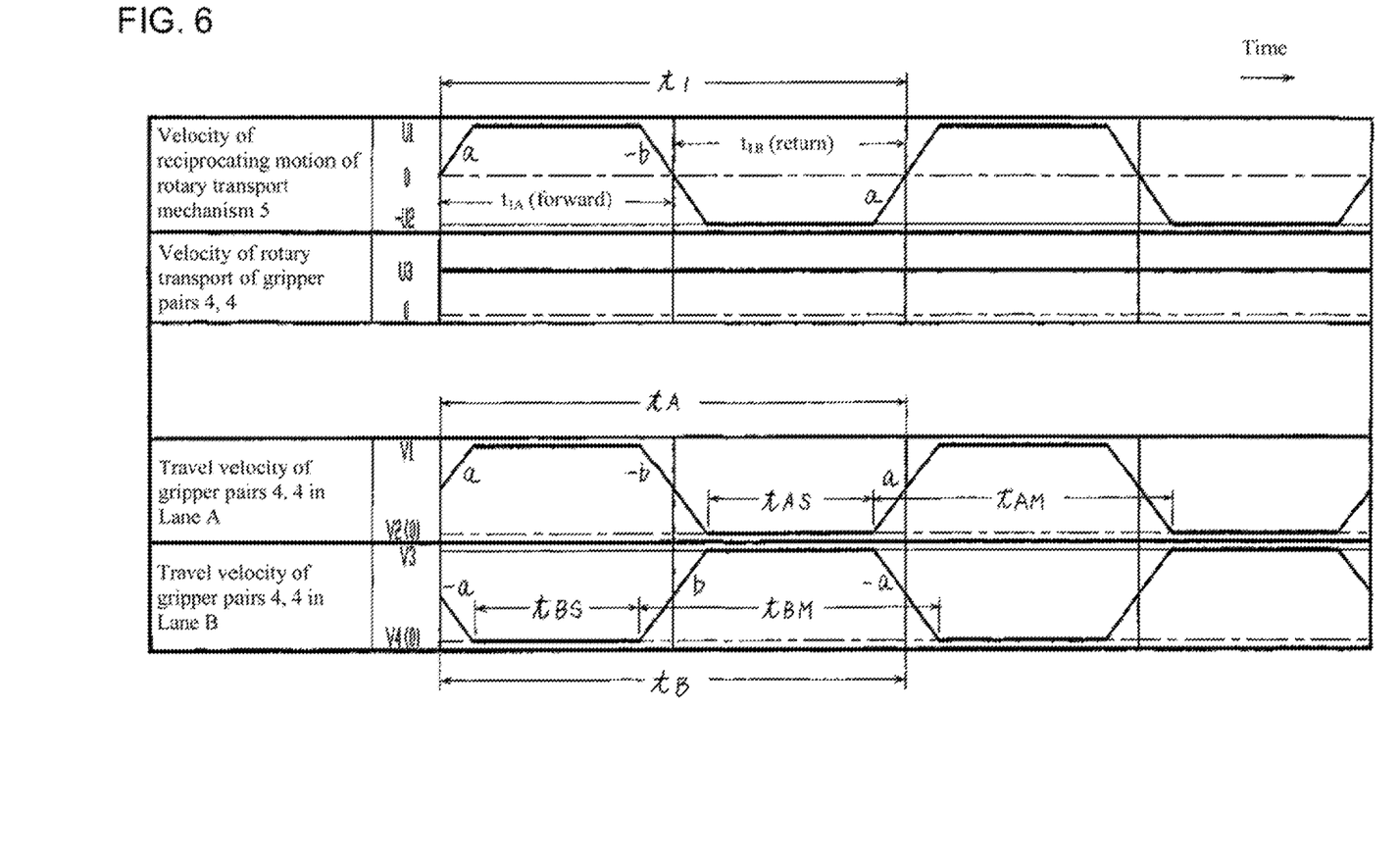
FIG. 6 is a diagram illustrating the operating pattern of the transport apparatus (in particular, an article holding members thereof) according to the present invention.
Figure 7:
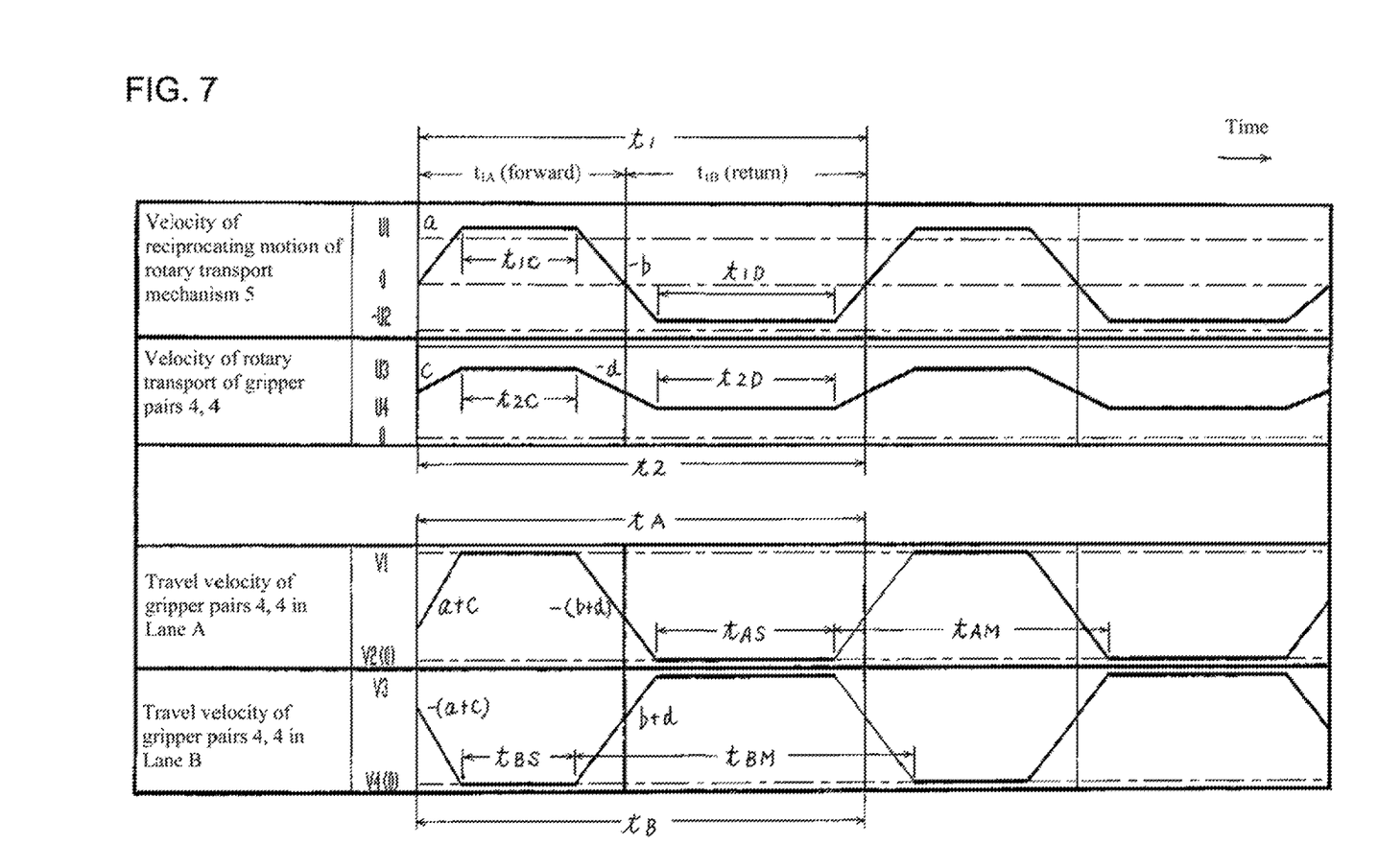
FIG. 7 is a diagram illustrating the operating pattern of the transport apparatus (in particular, an article holding members thereof)according to the present invention.
Figure 8:
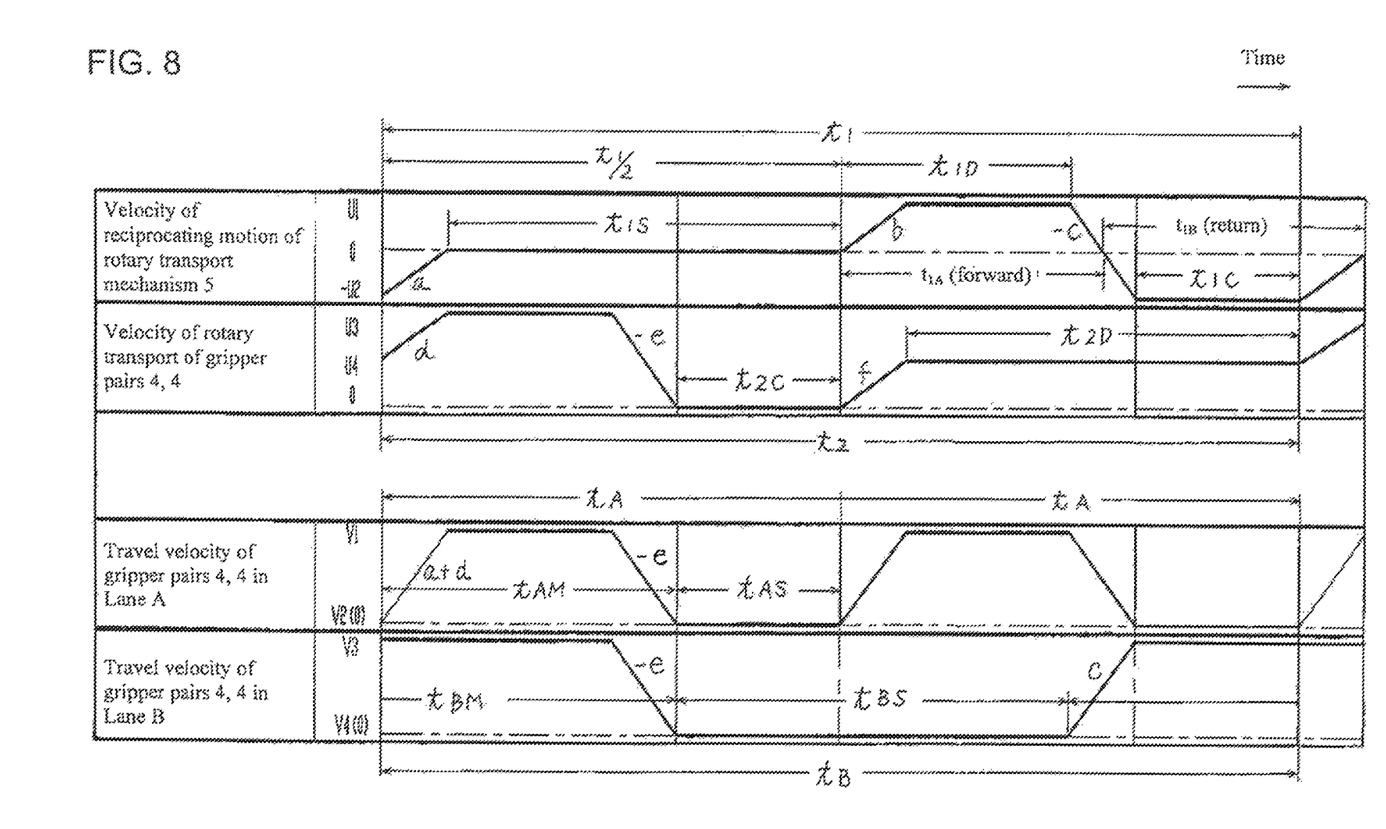
FIG. 8 is a diagram illustrating the operating pattern of the transport apparatus (in particular, an article holding members thereof) according to the present invention.

In FIGS. 6 to 8, the velocity of the reciprocating motion of the rotary transport mechanism 5 is described as "positive velocity" when referring to the direction of travel of the gripper pairs 4, 4 in Lane A (left-to-right travel in FIGS. 1 to 3), and as "negative velocity" when referring to the opposite direction. In addition, the velocity of the reciprocating motion of the rotary transport mechanism 5 is positive in the case of forward travel (travel from left-to-right in FIGS. 1 to 3) and negative in the case of return travel (travel from right-to-left in FIGS. 6 to 8). FIG. 1 illustrates the distance D of the reciprocating motion of the rotary transport mechanism 5.

FIG. 6 illustrates the operating pattern of reciprocating motion of the rotary transport mechanism 5 (made by the reciprocating drive mechanism 6) and the operating pattern of rotary transport of the grippers 4, 4 (made by the rotary transport mechanism 5), wherein:

the intermittent travel distance, and the intermittent stop duration of the gripper pairs 4, 4 are the same in Lane A and in Lane B, which are the pair of parallel portions.

In the operating pattern of reciprocating motion of the rotary transport mechanism 5 illustrated in FIG. 6, a single unit (one cycle) is made up of:

increasing velocity (acceleration: a)→constant velocity (velocity: $U_1$)→decreasing velocity (acceleration: −b)→constant velocity (velocity: $-U_2$).

The accelerations a and b and velocities $U_1$ and $U_2$ are configured such that a=b and $U_1=U_2$, and if the forward travel duration of the rotary transport mechanism 5 is designated as $t_{1A}$ and the return travel duration is designated as $t_{1B}$, then $t_{1A}=t_{1B}$. The rotation of the servo motor 8 is controlled by the control unit 9 such that the reciprocating motion of the rotary transport mechanism 5 repeats the above-described cycle.

The velocity of rotary transport of the grippers 4, 4 is constant (velocity: $U_3$) and configured such that $U_3=U_2$.

The rotation of the servo motor 7 is controlled by the control unit 9 such that the velocity of rotary transport of the gripper pairs 4, 4 is a constant velocity ($U_3$).

The velocity of travel of the gripper pairs 4, 4 in Lane A and in Lane B is a combination of the velocity of reciprocating motion of the rotary transport mechanism 5 and the velocity of rotary transport of the gripper pairs 4, 4.

In the operating pattern of travel of the gripper pairs 4, 4 in Lane A, a single unit (one cycle) is made up of:

increasing velocity (acceleration: a)→constant velocity (velocity: $V_1=U_3+U_1$)→decreasing velocity (acceleration: −b)→stopped (velocity: $V_2=U_3-U_2=0$), and this cycle is repeated.

In the operating pattern of travel of the gripper pairs 4, 4 in Lane B, a single unit (one cycle) is made up of:

decreasing velocity (acceleration: −a)→stopped ($V_4=U_3-U_1=0$)→increasing velocity (acceleration: b)→constant velocity ($V_3=U_3+U_2$), and this cycle is repeated.

Referring to the operating pattern illustrated in FIG. 6, if the duration of one (1) cycle of the operating pattern of reciprocating motion of the rotary transport mechanism 5 is designated as $t_1$, the duration of one (1) cycle of the operating pattern of travel of the gripper pairs 4, 4 in Lane A is designated as $t_A$, and the duration of one (1) cycle of the operating pattern of travel of the gripper pairs 4, 4 in Lane B is designated as $t_B$, then $t_A=t_B=t_1$.

In Lane A, the gripper pairs 4, 4 come to a stop in the course of constant velocity travel during the return travel of the rotary transport mechanism 5, and in Lane B, the grippers 4, 4 come to a stop in the course of constant velocity travel during the forward travel of the rotary transport mechanism 5. In this example, if the stop duration of the gripper pairs 4, 4 in Lane A is designated as $t_{AS}$ and the stop duration of the gripper pairs 4, 4 in Lane B is designated as $t_{BS}$, then the two are equal ($t_{AS}=t_{BS}$). In addition, if the travel duration of the gripper pairs 4, 4 in Lane A is designated as $t_{AM}$ and the travel duration of the gripper pairs 4, 4 in Lane B is designated as $t_{BM}$, then the two are equal ($t_{AM}=t_{BM}$). Furthermore, the operating patterns of reciprocating motion of the rotary transport mechanism 5 and the rotary transport of the gripper pairs 4, 4 are configured such that the distance traveled by the grippers 4, 4 throughout the travel duration $t_{AM}$ ($t_{BM}$) is an integral multiple of the pitch p. In this example, if the single travel distance of the gripper pairs 4, 4 in Lane A is m×p (where m is a positive integer) and the single travel distance of the gripper pairs 4, 4 in Lane B is n×p (where n is a positive integer), then m=n.

FIG. 7 illustrates the operating pattern of reciprocating motion of the rotary transport mechanism 5 (made by the reciprocating drive mechanism 6) and the operating pattern of rotary transport of the grippers 4, 4 (made by the rotary transport mechanism 5), wherein:
  the intermittent travel distance of the gripper pairs 4, 4 are the same in Lane A and in Lane B, and
  the intermittent stop duration of the gripper pairs 4, 4 in Lane A is longer than that in Lane B.

In the operating pattern of reciprocating motion of the rotary transport mechanism 5 illustrated in FIG. 7, a single unit (one cycle) is made up of:
  increasing velocity (acceleration: a)→constant velocity (velocity: $U_1$)→decreasing velocity (acceleration: −b)→constant velocity (velocity: −$U_2$).

The accelerations a and b and velocities $U_1$ and $U_2$ are configured such that a=b and $U_1>U_2$.

In one (1) cycle of reciprocating motion of the rotary transport mechanism 5, if the forward travel duration is designated as $t_{1A}$ and the return travel duration is designated as $t_{1B}$, then $t_{1A}<t_{1B}$, since the distance traveled during the period of return travel ($t_{1B}$) is equal to the distance traveled during the period of forward travel ($t_{1A}$).

The rotation of the servo motor 8 is controlled by the control unit 9 such that the reciprocating motion of the rotary transport mechanism 5 repeats the above-described cycle.

In the operating pattern of rotary transport of the gripper pairs 4, 4, a single unit (one cycle) is made up of:
  increasing velocity (acceleration: c)→constant velocity (velocity: $U_3$)→decreasing velocity (acceleration: −d)→constant velocity (velocity: $U_4$),
and the operating pattern is configured such that c=d and $U_3>U_4$.

The rotation of the servo motor 7 is controlled by the control unit 9 such that the rotary transport of the gripper pairs 4, 4 repeats the above-described cycle.

Referring to the operating pattern illustrated in FIG. 7, if the duration of one (1) cycle of reciprocating motion of the rotary transport mechanism 5 is designated as $t_1$ and the duration of one (1) cycle of rotary transport of the gripper pairs 4, 4 is designated as $t_2$, then the two are equal ($t_2=t_1$), and the timing of commencement of acceleration/deceleration and constant velocity travel of the rotary transport mechanism 5 coincides with the timing of commencement of acceleration/deceleration and constant velocity transport of the grippers 4, 4. Furthermore, if the duration of constant velocity travel during the forward travel of the rotary transport mechanism 5 is designated as $t_{1C}$ and the duration of constant velocity travel of the gripper pairs 4, 4 at a velocity of $U_3$ is designated as $t_{2C}$, then the two are equal ($t_{1C}=t_{2C}$); and moreover, if the duration of constant velocity travel during the return travel of the rotary transport mechanism 5 is designated as $t_{1D}$ and the duration of constant velocity travel of the gripper pairs 4, 4 at a velocity of $U_4$ is designated as $t_{2D}$, then the two are equal ($t_{1D}=t_{2D}$).

The velocity of travel of the gripper pairs 4, 4 in Lane A and in Lane B is a combination of the velocity of reciprocating motion of the rotary transport mechanism 5 and the velocity of rotary transport of the gripper pairs 4, 4.

In the operating pattern of travel of the gripper pairs 4, 4 in Lane A, a single unit (one cycle) is made up of:
  increasing velocity (acceleration: a+c)→constant velocity (velocity: $V_1=U_3+U_1$)→decreasing velocity (acceleration: −(b+d))→stopped (velocity: $V_2=U_4−U_2=0$),
and this cycle is repeated.

The gripper pairs 4, 4 come to a stop for a fixed period of time during the return travel of the rotary transport mechanism 5, and if the stop duration is designated as $t_{AS}$, then $t_{AS}=t_{1D}=t_{2D}$.

In the operating pattern of travel of the gripper pairs 4, 4 in Lane B, a single unit (one cycle) is made up of:
  decreasing velocity (acceleration: −(a+c))→stopped ($V_4=U_3−U_1=0$)→increasing velocity (acceleration: b+d)→constant velocity ($V_3=U_4+U_2$),
and this cycle is repeated.

The gripper pairs 4, 4 come to a stop for a fixed period of time during the forward travel of the rotary transport mechanism 5, and if the stop duration is designated as $t_{BS}$, then $t_{BS}=t_{1C}=t_{2C}$.

If the duration of one (1) cycle of the operating pattern of travel of the gripper pairs 4, 4 in Lane A is designated as $t_A$ and the duration of one (1) cycle of the operating pattern of travel of the gripper pairs 4, 4 in Lane B is designated as $t_B$, then the two are equal ($t_A=t_B$). On the other hand, the stop duration of the gripper pairs 4, 4 in Lane A ($t_{AS}$) is longer than the stop duration of the gripper pairs 4, 4 in Lane B ($t_{BS}$) ($t_{AS}>t_{BS}$), and the travel duration of the gripper pairs 4, 4 in Lane A ($t_{AM}$) is shorter than the travel duration of the gripper pairs 4, 4 in Lane B ($t_{BM}$) ($t_{AM}<t_{BM}$). Additionally, the operating patterns of the reciprocating motion of the rotary transport mechanism 5 and the rotary transport of the gripper pairs 4, 4 are configured such that the distance traveled by the grippers 4, 4 throughout the travel duration $t_{AM}$ ($t_{BM}$) is an integral multiple of the pitch p. In this example, if the single travel distance of the gripper pairs 4, 4 in Lane A is m×p (where m is a positive integer) and the single travel distance of the gripper pairs 4, 4 in Lane B is n×p (where n is a positive integer), then m=n.

It should be noted that according to the operating pattern illustrated in FIG. 7, the stop duration of the gripper pairs 4, 4 is longer in Lane A and shorter in Lane B ($t_{AS}>t_{BS}$) and, as a result, productivity can be increased by appropriately deploying steps requiring different processing times, such as carrying out a step that requires a longer stop duration (e.g., a filling step) in Lane A and carrying out a step for which a shorter stop duration is sufficient (e.g., a bag supplying step) in Lane B, etc.

FIG. 8 illustrates the operating pattern of reciprocating motion of the rotary transport mechanism 5 (made by the reciprocating drive mechanism 6) and the operating pattern of rotary transport of the grippers 4, 4 (made by the rotary transport mechanism 5), wherein:
  the intermittent travel distance, and the intermittent stop duration, of the gripper pairs 4, 4 in Lane A are shorter than those in Lane B (the intermittent travel distance in Lane A being half (½) of that in Lane B).

In the operating pattern of reciprocating motion of the rotary transport mechanism 5 illustrated in FIG. 8, a single unit (one cycle) is made up of:

increasing velocity (acceleration: a)→stopped (forward travel commencement position)→increasing velocity (acceleration: b)→constant velocity (velocity: $U_1$)→decreasing velocity (acceleration: $-c$)→constant velocity (velocity: $-U_2$), and the operating pattern is configured such that $a=b=c/2$, $U_1=U_2$; and if the forward travel duration of the rotary transport mechanism 5 is designated as $t_{1A}$ and the return travel duration as $t_{1B}$, then $t_{1A}=t_{1B}$. In addition, in one (1) cycle of reciprocating motion of the rotary transport mechanism 5, the time that elapsed from the commencement of acceleration (acceleration: a) to the commencement of the next acceleration (acceleration: b) is set to half the duration of one (1) cycle ($t_1$), with the rotary transport mechanism 5 stopped in the forward travel commencement position for the most part of this period ($t_1/2$) (with the exception of during acceleration).

The rotation of the servo motor 8 is controlled by the control unit 9 such that the reciprocating motion of the rotary transport mechanism 5 repeats the above-described cycle.

In the operating pattern of rotary transport of the gripper pairs 4, 4, a single unit (one cycle) is made up of:

increasing velocity (acceleration: d)→constant velocity (velocity: $U_3$)→decreasing velocity (acceleration: $-e$)→stopped→increasing velocity (acceleration: f)→constant velocity (velocity: $U_4$), and the operating pattern is configured such that $d=e/2=f$, and $U_3=2\times U_4$.

The rotation of the servo motor 7 is controlled by the control unit 9 such that the rotary transport of the gripper pairs 4, 4 repeats the above-described cycle.

Referring to the operating pattern illustrated in FIG. 8, if the duration of one (1) cycle of rotary transport of the gripper pairs 4, 4 is designated as $t_2$, this duration $t_2$ is equal to the duration of one (1) cycle ($t_1$) of reciprocating motion of the rotary transport mechanism 5 ($t_2=t_1$) and the timing of commencement of acceleration during the reciprocating motion of the rotary transport mechanism 5 matches the timing of commencement of acceleration during the rotary transport of the gripper pairs 4, 4. In addition, if the stop duration during the reciprocating motion of the rotary transport mechanism 5 is designated as $t_{1S}$ and the duration of constant velocity travel of the gripper pairs 4, 4 at a velocity of $U_4$ is designated as $t_{2D}$, then the two are equal ($t_{1S}=t_{2D}$). Also, if the duration of constant velocity travel during the return travel of the rotary transport mechanism 5 is designated as $t_{1C}$ and the stop duration during the rotary transport of the gripper pairs 4, 4 is designated as $t_{2C}$, then the two are equal ($t_{2C}=t_{1C}$).

The velocity of travel of the gripper pairs 4, 4 in Lane A and in Lane B is a combination of the velocity of reciprocating motion of the rotary transport mechanism 5 and the velocity of rotary transport of the gripper pairs 4, 4.

In the operating pattern of travel of the gripper pairs 4, 4 in Lane A, a single unit (one cycle) is made up of:

increasing velocity (acceleration: a+d)→constant velocity (velocity: $V_1=U_3$)→decreasing velocity (acceleration: $-e$)→stopped (velocity: $V_2=0$), and this cycle is repeated.

If the duration of one (1) cycle of travel of the gripper pairs 4, 4 in Lane A is designated as $t_A$, then this duration $t_A$ is equal to ½ of the duration of one (1) cycle ($t_1$) of reciprocating motion of the rotary transport mechanism 5 ($t_A=t_1/2$). If the stop duration of the gripper pairs 4, 4 in Lane A is designated as $t_{AS}$, then this stop duration ($t_{AS}$) is equal to the stop duration ($t_{2C}$) during the rotary transport of the gripper pairs 4, 4 ($t_{AS}=t_{2C}$).

In the operating pattern of travel of the gripper pairs 4, 4 in Lane B, a single unit (one cycle) is made up of:

constant velocity (velocity $V_3=U_3=U_4+U_2$)→decreasing velocity (acceleration: $-e$),→stopped (velocity: $V_4=0$) →increasing velocity (acceleration: c), and this cycle is repeated.

If the duration of one (1) cycle of travel of the gripper pairs 4, 4 in Lane B is designated as $t_B$, then this duration is equal to the duration of one (1) cycle ($t_1$) of reciprocating motion of the rotary transport mechanism 5 ($t_B=t_1$). If the stop duration in one (1) cycle of travel of the gripper pairs 4, 4 is designated as $t_{BS}$, this stop duration ($t_{BS}$) is equal to the sum of the stop duration during the rotary transport of the gripper pairs 4, 4 ($t_{2C}$) and the time elapsed from the commencement of acceleration during the forward travel of the rotary transport mechanism 5 to the end of constant velocity travel ($t_{1D}$) ($t_{BS}=t_{2C}+t_{1D}$).

The duration of one (1) cycle of travel of the gripper pairs 4, 4 in Lane B ($t_B$) is double the duration of one (1) cycle of travel of the gripper pairs 4, 4 in Lane A ($t_A$) ($t_B=2t_A$). Accordingly, while the gripper pairs 4, 4 travel and stop once in Lane B, the gripper pairs 4, 4 travel and stop twice in Lane A. The stop duration of the gripper pairs 4, 4 in Lane B ($t_{BS}$) is considerably longer than the stop duration of the gripper pairs 4, 4 in Lane A ($t_{AS}$) ($t_{BS}>t_{AS}$). In addition, if the travel duration in one (1) cycle of travel of the gripper pairs 4, 4 in Lane A is designated as $t_{AM}$ ($=t_A-t_{AS}$) and the travel duration in one (1) cycle of travel of the gripper pairs 4, 4 in Lane B is designated as $t_{BM}$ ($=t_B-t_{BS}$), then the operating patterns of the reciprocating motion of the rotary transport mechanism 5 and the rotary transport of the gripper pairs 4, 4 are configured such that, in Lane A, the distance traveled by the grippers 4, 4 throughout the travel duration $t_{AM}$ is an integral multiple of the pitch p, and, in Lane B, the distance traveled by the grippers 4, 4 throughout the travel duration $t_{BM}$ is an integral multiple of the pitch p. In this example, if the single travel distance of the gripper pairs 4, 4 in Lane A is m×p (where m is a positive integer) and the single travel distance of the gripper pairs 4, 4 in Lane B is n×p (where n is a positive integer), then 2m=n.

It should be noted that, according to the operating pattern illustrated in FIG. 8, the stop duration of the gripper pairs 4, 4 is shorter in Lane A and longer in Lane B ($t_{BS}>t_{AS}$), and, as a result, it is possible to increase productivity by appropriately deploying steps with different processing times, such as carrying out a step for which a shorter stop duration is sufficient (e.g., a bag supplying step) in Lane A and carrying out a step that requires a longer stop duration (e.g., a filling step) in Lane B.

In the transport apparatus 1 of the bag-filling packaging machine illustrated in FIG. 1, the operating patterns of the reciprocating motion of the rotary transport mechanism 5 and the rotary transport of the gripper pairs 4, 4 are set to match the pattern illustrated in FIG. 8, such that while a single cycle of travel and stops of the gripper pairs 4, 4 takes place in Lane B, two cycles take place in Lane A. In addition, while the single travel distance of the gripper pairs 4, 4 in Lane A is set to 2×p, the single travel distance of the gripper pairs 4, 4 in Lane B is set to 4×p.

As seen from FIG. 1, a bag supplying device (conveyer magazine-type bag supplying device) 46 that supplies empty bags 45 to the grippers 4, 4, a mouth opening device (two pairs of mouth-opening suction cups 47, 47 thereof are shown) that opens the mouths of the bags 45, a sealing device 48 that seals the mouths of filled bags, a cooling device 49 that cools the sealed portions of the filled bags, and a conveyer 51 that transports the thus made product bags 45A out of the packaging machine, are installed along Lane A of the transport apparatus 1. The bag supplying device 46, which is a two-line type device, is capable of supplying two bags 45 at a time, the mouth opening device is capable of opening the mouths of two bags 45 at once, and the sealing device 48 and cooling device 49 are capable of performing sealing and cooling process on two bags 45 at a single time.

Along Lane B of the transport apparatus 1, a filling device for solid materials (only four hoppers 52 thereof are shown) and a filling device for liquid materials (only four filling nozzles 53 thereof are shown) are installed. These filling devices are capable of dispensing solid and liquid materials into four bags 45 at the same time.

Below, the packaging process used in the above-described bag-filling packaging machine will be described in detail according to the order of steps.

(1) Supplying the Bags

When the gripper pairs 4, 4 come to a stop in Lane A, the bag supplying device 46 simultaneously supplies bags 45 to two gripper pairs 4, 4, respectively (or one bag to one gripper pair, a total of 2 bags). The two gripper pairs 4, 4 respectively grip both lateral edge portions of each of the supplied bags 45 and hold them in a suspended state with the mouths of the bags pointing upwards.

(2) Opening the Mouths of the Bags

When the gripper pairs 4, 4 come to a next stop in Lane A, two sets of mouth-opening suction cups 47, 47 approach each other, adhere to the films on both sides of each bag 45 (a total of 2), and then move away from each other, thereby separating the films on the two sides of the bags and opening the mouths of the bags.

(3) Filling with Solid Material

When the gripper pairs 4, 4 come to a stop in Lane B, four hoppers 52 are lowered, their lower ends are inserted into the mouths of the (four) bags 45, and solid material is dispensed through the hoppers 52 into the bags. After dispensing the solid material, the hoppers 52 are raised out of the bags.

(4) Filling with Liquid Material

When the gripper pairs 4, 4 come to a next stop in Lane B, four filling nozzles 53 are lowered, their lower ends are inserted into the (four) bags 45, and liquid material is dispensed into the bags. After dispensing the liquid material, the filling nozzles 53 are raised out of the bags.

(5) Sealing

The sealing device 48 has two sets of sealing members 54, 54. The sealing members 54 are respectively comprised of a pair of hot plates that are opened (separated from each other) and closed (contacted with each other). When the gripper pairs 4, 4 come to a stop in Lane A, the sealing members 54 are closed, sealing the mouths of the bags 45 (a total of 2) held by the gripper pairs 4, 4. After sealing, the sealing members 54 are opened and the bags 45 are released from the sealing members 54.

(6) Cooling

The cooling device 49 has two sets of cooling members 55, 55. The cooling members 55 are respectively comprised of a pair of cooling plates that are opened (separated from each other) and closed (contacted with each other). When the gripper pairs 4, 4 come to a stop in Lane A, the cooling members 55 are closed, cooling the sealed portions of the bags 45 (a total of 2) held by the gripper pairs 4, 4. After cooling, the cooling members 55 are opened, the product (filled and sealed) bags 45A are released from the cooling members 55, dropped onto the lower conveyer 51, and transported out of the packaging machine by the same conveyer 51.

In the bag-filling packaging machine illustrated in FIG. 1, two cycles of travel and stops of the grippers 4, 4 take place in Lane A while a single cycle of travel and stops of the grippers 4, 4 takes place in Lane B. The process of packaging by the devices takes place each time the grippers 4, 4 come to a stop, such that the above-described bag supplying, mouth-opening, sealing, and cooling steps take place twice in Lane A while the above-described filling step (solid material and/or liquid material) takes place once in Lane B. Since the stop duration ($t_{BS}$) in Lane B can be extended, the filling step, which takes a relatively long time, can be easily carried out during the stop period without adversely affecting the productivity of the bag-filling packaging machine.

Figure 9:
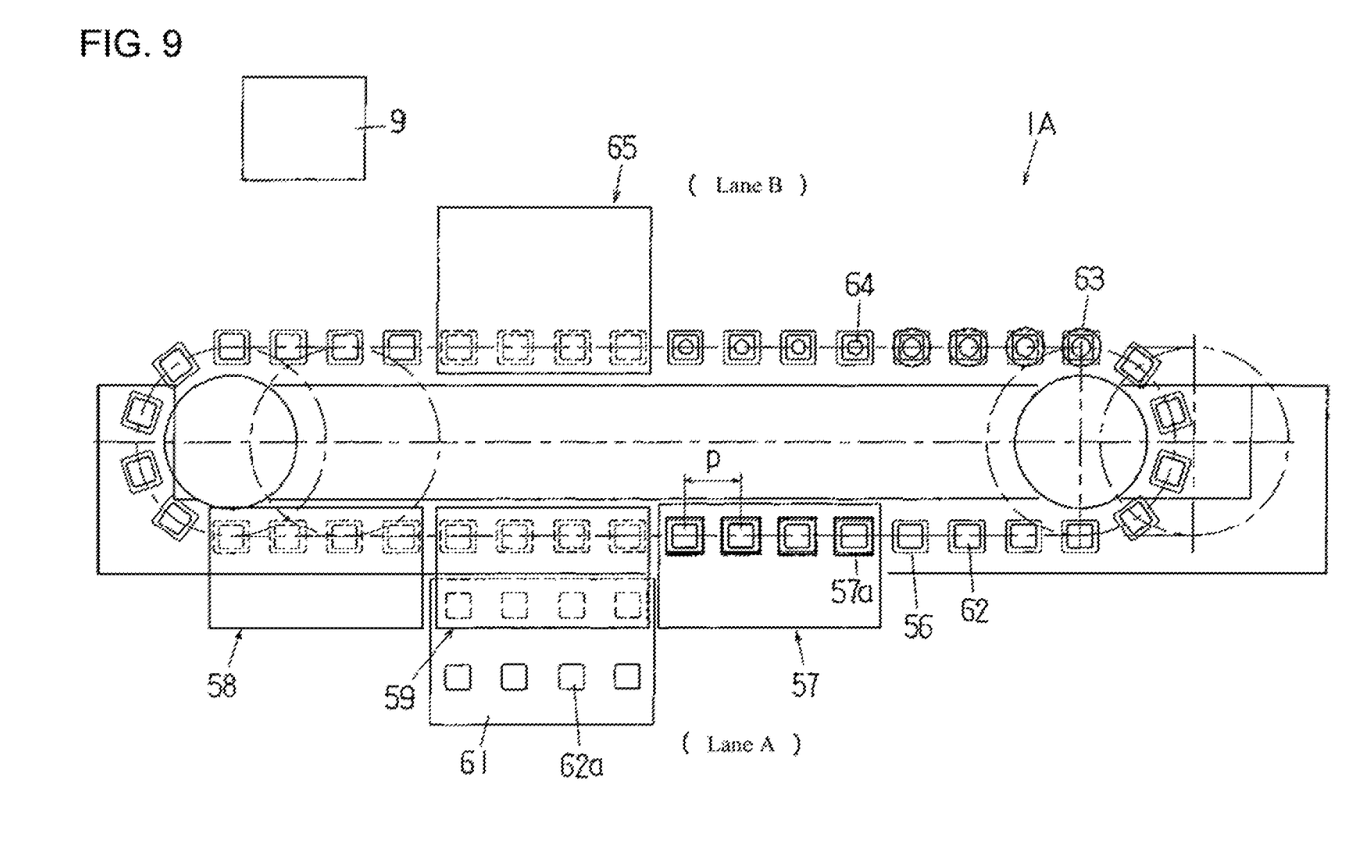
FIG. 9 is an overall top view of a cup-filling packaging machine incorporating a transport apparatus according to the present invention.

FIG. 9 illustrates a cup-filling packaging machine equipped with the transport apparatus 1A according to the present invention. The transport apparatus 1A differs from the transport apparatus 1 of the bag-filling packaging machine illustrated in FIG. 1 in only one respect, namely, in that, instead of the gripper pairs 4, 4, it is provided with cup holding members 56 used as article holding members. The cup holding members 56 are provided at equal intervals (pitch=p) on the upper chain 2 and lower chain 3 (see FIG. 3). The cup holding members 56 have holes for holding cups (see "aperture 3" of the packaging apparatus described in Japanese Patent Application Laid-Open (Kokai) No. H03-240615).

In this cup-filling packaging machine, cups are supplied to the cup holding members 56 of the transport apparatus 1A; and, as the cup holding members 56 travel along the annular trackway, they are transported along the annular transport path superimposed on the annular trackway and are subjected to packaging operations by a plurality of devices disposed along the pair of parallel portions of the annular trackway.

In this transport apparatus 1A of FIG. 9, the operating patterns of the reciprocating motion of the rotary transport mechanism 5 and the rotary transport of the cup holding members 56 are set so as to match the patterns illustrated in FIG. 6 (or FIG. 7), so that while a single cycle of travel and stops of the cup holding members 56 takes place in Lane A, a single cycle also takes place in Lane B. The single travel distance of the cup holding members 56 along Lane A and Lane B is set to 4×p (4 pitches).

More specifically, a cup supplying device 57 which supplies empty cups to the cup holding members 56, a sealing device 58 which seals the top openings of filled cups with lidding film, a cooling device 59 which cools the sealed portions of the cups, and a conveyer 61 which transports product cups out of the packaging machine, are installed along Lane A of the transport apparatus 1A.

The cup supplying device 57 has four magazine sections 57a along Lane A, in which cups 62 are held, stacked in the vertical direction. The cups 62 are dispensed from each magazine section 57a and are simultaneously supplied to four cup holding members 56 below, respectively (or one cup to each cup holding member, a total of 4 cups). The cups 62 are held in the above-mentioned holes of the cup holding members 56. The sealing device 58 has hot plates that move in the vertical direction (see "permanent sealing means 8" in the packaging apparatus described in the above-identified Japanese Patent Application Laid-Open (Kokai) No. H03-240615) and seals the lidding film to the edges of the top openings of the cups 62 by pressing the lidding film from the top against the cups 62 using the hot plates. The sealing device 58 can simultaneously seal lidding film on four cups. The cooling device 59, which cools the sealed portions of the cups 62 by air blowing (see "sealed portion cooling device 9" in the packaging apparatus described in above-identified Japanese Patent Application Laid-Open (Kokai) No. H03-240615), is capable of simultaneously cooling four cups.

Along Lane B of the transport apparatus 1A, a filling device for solid materials (only four hoppers 63 thereof are shown), a filling device for liquid materials (only four filling nozzles 64 thereof are shown), and a pre-sealing device 65 are provided.

The above-described filling devices can fill four cups with solid and liquid materials at a single time. The pre-sealing device 65, which cuts out lidding film from film paid out from a supply drum and presses the cut-out lidding film against the edges of the top openings of the cups 62 with hot plates, thereby pre-sealing the lidding film to the top edges of the cups (see "pre-sealing means 6" in the packaging apparatus described in above-identified Japanese Patent Application Laid-Open (Kokai) No. H03-240615), is capable of simultaneously pre-sealing the lidding film on four cups.

The packaging process used in the above-described cup-filling packaging machine will be described in detail below in accordance with the order of steps.

(1) Supplying the Cups

When the cup holding members 56 come to a stop in Lane A, the cup supplying device 57 simultaneously supplies cups 62 to four cup holding members 56, respectively (or one cup to one cup holding member, a total of 4 cups). The cups 62 are held in the holes provided in the cup holding members 56.

(2) Filling with Solid Material

When the cup holding members 56 come to a stop in Lane B, solid material is simultaneously dispensed into four cups 62 through the (four) hoppers 63.

(3) Filling with Liquid Material

When the cup holding members 56 come to a next stop in Lane B, liquid material is simultaneously dispensed into four cups 62 through the (four) filling nozzles 64.

(4) Pre-Sealing

When the cup holding members 56 come to a next stop in Lane B, the pre-sealing device 65 is used to simultaneously supply lidding film for the four cups 62 and subsequently pre-seal the lidding film to the cups 62.

(5) Sealing

When the cup holding members 56 come to a stop in Lane A, the sealing device 58 is used to simultaneously permanently seal the four cups 62 with lidding film.

(6) Cooling

When the cup holding members 56 come to a next stop in Lane A, the cooling device 59 is used to simultaneously cool the sealed portions of the four cups 62. The cooled product cups 62A are pushed upwards from the holes provided in the cup holding members 56 by a push-up device (not shown), transferred from the cup holding members 56 onto the conveyer 61 by a take-out device (for information on the push-up and take-out devices, see "push-up device 21" and "take-out device 23" in the packaging apparatus described in above-identified Japanese Patent Application Laid-Open (Kokai) No. H03-240615), and transported out of the packaging machine by the conveyer 61.

While the foregoing descriptions are made for three types of operating patterns (see FIGS. 6 to 8) as typical examples of the operating patterns of travel of the article holding members (gripper pairs 4, 4 and cup holding members 56) in Lane A and Lane B, changing the operating patterns of the reciprocating motion of the rotary transport mechanism 5 and the rotary transport of the article holding members (gripper pairs 4, 4 and cup holding members 56) makes it possible to obtain a wide variety of operating patterns of travel of the article holding members in Lane A and Lane B.

The invention claimed is:

1. An article transport apparatus comprising:
a rotary transport mechanism that rotationally transports multiple equidistantly installed article holding members in one direction along an annular trackway having a pair of parallel portions; and
a reciprocating drive mechanism that causes the entire rotary transport mechanism to reciprocate a predetermined distance along the parallel portions,
the rotary transport mechanism and the reciprocating drive mechanism having independent drive sources,
wherein a first drive source of the independent drive sources drives the rotary transport mechanism such that the article holding members rotate in one direction along the annular trackway,
wherein a second drive source of the independent drive sources drives the reciprocating drive mechanism to cause reciprocal movement of the rotary transport mechanism,
wherein each one of said drive sources includes a servo motor,
wherein the article holding members have a velocity of travel that is a combination of a velocity of reciprocating motion and a velocity of rotary transport, and
wherein the article transport apparatus is further comprised of:
a control unit that controls rotations of both servo motors,
a velocity of rotary transport and a velocity of reciprocating motion are controlled by the control unit, and
the article holding members travel along the parallel portions on both sides of the annular trackway in an intermittent manner, each time covering a distance that is an integral multiple of an installation spacing of the article holding members.

2. The article transport apparatus according to claim 1, wherein the rotation of both servo motors is controlled such that first intermittent travel distances of the article holding members along a first parallel portion of the pair of parallel portions are different from second intermittent travel distances of the article holding members along a second parallel portion of the pair of parallel portions.

3. The article transport apparatus according to claim 1, wherein the rotation of both servo motors is controlled such that first intermittent travel distances of the article holding members along a first parallel portion of the pair of parallel portions are the same as second intermittent travel distances of the article holding members along a second parallel portion of the pair of parallel portions.

4. The article transport apparatus according to claim 1, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

5. The article transport apparatus according to claim 2, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

6. The article transport apparatus according to claim 3, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

7. The article transport apparatus according to claim 1, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

8. The article transport apparatus according to claim 2, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

9. The article transport apparatus according to claim 3, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

10. The article transport apparatus according to claim 2, wherein the intermittent travel distances correspond to a distance traveled by the article holding members on one side and between two stop durations where the article holding members have the velocity of travel of zero.

11. The article transport apparatus according to claim 10, wherein a stop duration corresponds to a period of time where the article holding members have the velocity of travel of zero caused by the velocity of reciprocating motion and the velocity of rotary transport being of equal magnitude and opposite sign.

12. A packaging machine comprising:
the article transport apparatus according to claim 1;
an article supplying device configured to supply the article to the article holding members and positioned adjacent to a first parallel portion of the pair of parallel portions on a first side of the annular trackway; and
a filling device that is for dispensing materials to be packaged into the articles held by the article holding members is positioned adjacent to a second parallel portion of the pair of parallel portions on a second side of the annular trackway, and
wherein, with m and n being positive integers,
an intermittent travel distance of the article holding members is m times the installation spacing of the article holding members along the first parallel portion on the first side and n times the installation spacing of the article holding members along the second parallel portion on the second side,
the article supplying device supplies the articles simultaneously to m article holding members that come to a stop in the first parallel portion on the first side, and
the filling device simultaneously dispenses materials to be packaged into the article held by n article holding members that come to a stop in the second parallel portion on the second side.

13. The packaging machine according to claim 12, wherein:
the packaging machine comprises a bag-filling packaging machine;
the articles are bags; and
the article holding members are bag holding members that hold the bags.

14. The packaging machine according to claim 12, wherein:
the packaging machine comprises a cup-filling packaging machine;
the articles are cups; and
the article holding members are cup holding members that hold the cups.

15. The packaging machine according to claim 12, wherein the rotation of both servo motors is controlled such that first intermittent travel distances of the article holding members along a first parallel portion of the pair of parallel portions are different from second intermittent travel distances of the article holding members along a second parallel portion of the pair of parallel portions.

16. The packaging machine according to claim 12, wherein the rotation of both servo motors is controlled such that first intermittent travel distances of the article holding members along a first parallel portion of the pair of parallel portions are the same as second intermittent travel distances of the article holding members along a second parallel portion of the pair of parallel portions.

17. The packaging machine according to claim 12, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

18. The packaging machine according to claim 15, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

19. The packaging machine according to claim 16, wherein the rotation of both servo motors is controlled such that, during intermittent travel of the article holding members, first stop durations of the article holding members along a first parallel portion of the pair of parallel portions are the same as second stop durations of the article holding members along a second parallel portion of the pair of parallel portions.

20. The packaging machine according to claim 12, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

21. The packaging machine according to claim 15, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

22. The packaging machine according to claim 16, wherein the rotation of both servo motors is controlled such that, during intermittent travel of the article holding members, first stop durations of the article holding members along a first parallel portion of the pair of parallel portions are different from second stop durations of the article holding members along a second parallel portion of the pair of parallel portions.

23. An article transport apparatus comprising:
a rotary transport mechanism configured to rotationally transport a plurality of article holding members along an annular trackway having a pair of parallel portions, wherein the plurality of article holding members have equidistant spacing;
a reciprocating drive mechanism configured to cause the rotary transport mechanism to reciprocate back and forth along an axis parallel to axes of the parallel portions, wherein the article holding members have a velocity of travel that is a combination of a velocity of reciprocating motion and a velocity of rotary transport;
a first drive source configured to drive the rotary transport mechanism such that the article holding members rotate in one direction along the annular trackway;
a second drive source configured to drive the reciprocating drive mechanism and to cause reciprocal movement of the rotary transport mechanism back and forth along the axis, the second drive source distinct from the first drive source; and
a controller configured to control rotations of the first drive source and the second drive source, wherein the controller is configured to control rotations of the first drive source and the second drive source such that:
the velocity of rotary transport and the velocity of reciprocating motion are controlled by the controller, and
the article holding members travel along the parallel portions in an intermittent manner, each time covering a distance that is an integral multiple of the equidistant spacing of the article holding members.

24. The article transport apparatus according to claim 23, wherein the controller is configured to control the rotations of both drive sources such that intermittent travel distances of the article holding members along each parallel portion of the pair of parallel portions are adjustable.

25. The article transport apparatus according to claim 23, wherein the controller is configured to control the rotations of both drive sources such that stop durations during intermittent travel of the article holding members along each parallel portion of the pair of parallel portions are adjustable.

26. The article transport apparatus according to claim 23, wherein the controller is configured to control the rotations of both drive sources such that:
intermittent travel distances of the article holding members along the parallel portions on one side and on the other side are different;
the intermittent travel distances of the article holding members along the parallel portions on one side and on the other side are the same;
a stop duration during intermittent travel of the article holding members along the parallel portions on one side and on the other side is the same;
the stop duration during the intermittent travel of the article holding members along the parallel portions on one side and on the other side is different; or
any combination thereof.

27. The article transport apparatus according to claim 23, wherein the first drive source or the second drive source is a servo motor.

* * * * *